United States Patent

[11] 3,615,660

[72] Inventors Vincent S. Bavisotto
Mahtomedi, Minn.;
Gavin L. Hansen, Grafton, Wis.
[21] Appl. No. 832,445
[22] Filed June 11, 1969
[45] Patented Oct. 26, 1971
[73] Assignee Pfizer Inc.
New York, N.Y.
Continuation-in-part of application Ser. No. 491,391, Sept. 29, 1971, now abandoned.

[54] HOP EXTRACT EMULSION, AND PREPARATION AND USE THEREOF
7 Claims, No Drawings
[52] U.S. Cl. .................................................. 99/50.5, 99/31
[51] Int. Cl. ...................................................... C12c 9/02
[50] Field of Search ........................................... 99/50, 50.5, 29, 45, 31

[56] References Cited
UNITED STATES PATENTS
| | | | |
|---|---|---|---|
| 2,248,153 | 7/1941 | Wood............................ | 99/50.5 |
| 3,044,879 | 7/1962 | Koch et al..................... | 99/50.5 |
| 3,181,953 | 5/1965 | Van Ness et al. ............. | 99/78 |

OTHER REFERENCES
Whistler et al., Industrial Gums, Academic Press, New York, 1959, pp. 271–274
Federal Register, 121.90, reprints, pp. 16–16.3
Noller, Chemistry of Organic Compounds, pp. 434–435

*Primary Examiner*—Joseph M. Golian
*Attorney*—Connolly and Hutz

ABSTRACT: Preisomerized and reduced hop extracts are stabilized by mixing with emulsifying agent, gum arabic, and preferably sorbitol in an aqueous medium. The products are cold water dispersible, and when added to the wort or beer after kettle boiling result in light-stable beer or ale.

HOP EXTRACT EMULSION, AND PREPARATION AND USE THEREOF

CROSS REFERENCE TO RELATED APPLICATION

This application is a continuation-in-part of the application Ser. No. 491,391 filed Sept. 29, 1965 and now abandoned.

BACKGROUND OF THE INVENTION

This invention relates to a process for solubilizing and stabilizing preisomerized and reduced hop extracts. In particular, this invention concerns a process for preparing stable emulsions of preisomerized and reduced hop extracts which are dispersible in cold solutions and provide beer and ale having improved light stability.

In the past few years many brewers have made extensive investigations of the potential utility of hop extracts in the manufacture of beer. The commercially available hop extracts are prepared by extracting and refining the resins and oils obtained from natural hops. The hop resins contain humulones ($\alpha$-acids) which are isomerized during the beer making process and, in particular, during the kettle boiling of the wort, to yield isohumulones which in turn are the source of the desirable bitter taste of beer and ale. The humulone-containing hop extracts are quite insoluble and during the beermaking process can only be added at the kettle-boiling stage in order to dissolve them. At the same time the high temperatures of the boiling wort converts the humulones to the desired bitter isohumulones. In some cases the hop extracts can be pretreated in order to isomerize the humulones before addition to the boiling wort. Nevertheless, even when the humulones are preisomerized the resulting hop extract is still relatively insoluble in cold solutions and are usually melted in a hot-water bath and then poured directly into the boiling wort, usually at kettle-full.

Beer and ale, whether made conventionally or with hop extracts, are generally not particularly stable to light. Even when exposed for short periods to light they develop an offensive odor and in such cases are characterized as being "light struck." Koch in U.S. Pat. No. 3,044,879 has reported that this problem can be partially obviated when preisomerized hop extracts are used in the beermaking process by first reducing the isohumulones by borohydride reduction before use. It is found that beer and ale made with this preisomerized and reduced hop extract is significantly more light stable than products made with unreduced hop extract. Nevertheless, this improved hop extract is an oily material which is not dispersible in cold solutions but must be added to the hot kettle stage in order to effect proper dispersion.

We have now developed stable emulsions of preisomerized and reduced hop extract which are dispersible in cold solutions and can therefore be added to the postfermentation stage of beer making. It has been surprisingly and unexpectedly discovered that beer and ale made with this stabilized product is substantially more light-stable than beer and ale made by adding nonemulsified preisomerized reduced hop extract to the kettle-boil stage of the beermaking process. Furthermore, the addition of these stable emulsions at the cold-stage of the beermaking process, i.e., postfermentation hopping, allows for a significant increase in isohumulone utilization.

SUMMARY OF THE INVENTION

This invention comprises a process for rendering a preisomerized and reduced hop extract dispersible in aqueous media, which comprises intimately mixing with said extract a nontoxic emulsifying agent and gum arabic.

In particular, this invention comprises a process for rendering a preisomerized and reduced hop extract dispersible in aqueous media, which comprises intimately mixing therewith in an aqueous medium a nontoxic emulsifying agent and between about 36 percent and 7 percent by weight of gum arabic and 0 percent and 45 percent by weight of sorbitol.

This invention further comprises a process for making beer and ale which comprises mashing the ground malt with or without an unmalted cereal adjunct, saccharifying the mash to produce fermentable sugars, filtering and sparging the mash to obtain a fermentable wort, boiling the wort to precipitate undesirable wort constituents and to destroy undesirable microflora, hopping the wort after kettle-boiling by the addition of the herein described stable emulsions of preisomerized and reduced hop extracts, and then fermenting the hopped wort.

In addition, the instant invention also comprises a process for making beer and ale which comprises mashing the ground malt with or without an unmalted cereal adjunct, saccharifying the mash to produce fermentable sugars, filtering and sparging the mash to obtain a fermentable wort, boiling the wort to precipitate undesirable wort constituents and to destroy undesirable microflora, fermenting the wort to beer and hopping the fermented beer by the addition of the herein described stable emulsions of preisomerized and reduced hop extracts.

The present invention also comprises a preisomerized and reduced hop extract composition comprising by weight from about 18 to about 180 parts of gum arabic, from about 18 to about 225 parts of sorbitol, from about 55 to about 220 parts of water and from about 0.1 to about 5 parts of emulsifying agent for each 100 parts of preisomerized and reduced hop extract.

Practice of the present invention now permits the manufacture of beer and ale having superior light-stability characteristics.

DETAILED DESCRIPTION OF THE INVENTION

The hop extract compositions made by the process of this invention are prepared with preisomerized and reduced hop extracts. The process for preparing these hop extracts is disclosed in U.S. Pat No. 3,044,879 to G. H. Koch, et al., which claims a method for extracting the bittering components of the hops and chemically isomerizing the humulones and reducing the isohumulones. The resulting extract retains the aroma, bitterness and bouquet of the hops and the beer made with this extract is less subject to deterioration due to light than are beers made with natural hops or unreduced hop extracts.

As previously mentioned, because of the properties of this preisomerized and reduced hop extract it must be added at the kettle-boiling stage of the beermaking process in order to effectuate dispersion and solution. We have now found methods for preparing stable emulsions of preisomerized and reduced hop extracts which permits them to be added to the cold-stage of the beermaking process, i.e., postfermentation hopping. We have surprisingly found that beer and ale prepared with these stable emulsions is significantly superior in light-stability properties as compared with the light-stability of beer and ale prepared by the addition of the unemulsified preisomerized and reduced hop extract to the kettle boil stage.

Hildebrand et al. have reported in U.S. Pat. Nos. 3,155,522 and 3,298,835 the preparation of emulsions of preisomerized nonreduced hop extracts which can be added to the wort after it has been boiled and cooled. However, it was not reported whether the use of these emulsions provides beer and ale having superior light-stability characteristics.

The sensitivity of beer to fluorescent light was tested using beer bottles of different colors and types, and using beer made with conventional whole hops, a preisomerized and reduced hop extract, and a stable emulsion of a preisomerized and reduced hop extract prepared according to the procedure of the present invention. The bottles of finished beer were placed in the light-stability cabinet in an upright position and held at an ambient temperature until examined. A special light-stability cabinet was made for this study, measuring 60 inches long, 33 inches wide and 48 inches high. The light source was supplied by two 44-inch, Super White 40W, Duro-Test, rapid-start fluorescent lights, rated at a wavelength range of 4,600 to 5,000 Angstroms. The light unit was suspended from the ceiling of the cabinet. The lamps provided a light intensity of 100-ft. candles as measured at the center portion of a beer bottle in upright position. The strength of the light source was tested using a General Electric, Type 213, Light Meter which has a maximum reading of 5,000-ft. candle power. The bottom surface of the cabinet was painted white.

Samples were removed periodically and chilled in a propylene glycol water bath at 20° C. for organoleptic tests. The chilled samples were poured into glasses and each panel member was asked to note the presence of a light-struck aroma. If some doubt existed in properly identifying this off-character, each individual tasted a small amount to verify the presence or absence of a light-struck character. Samples which exhibited a pronounced aroma were never tasted, because of the possible carryover of this off-flavor into the next sample. Samples with the defect were classified as having a pronounced light-struck character.

Finished beer in bottles hopped in the same manner as those in the fluorescent light studies was tested for light-struck character utilizing direct sunlight. The tests were conducted on clear sunny days when the candle power was greater than 5,000-ft. candles. The bottles were placed in a sunny area with a white background to absorb as much reflection as possible. The beer was exposed mainly in late spring and summer to make use of as much of the direct rays of the sun as possible. The taste testing was conducted following the same procedure described under the fluorescent light studies.

Organoleptic tests were made with beer hopped conventionally and with hop extract and hop extract emulsion, and bottled in flint export, amber nonreturnable and amber export bottles, to evaluate how the point of addition and type of container influenced the light stability of the beer. The beers were exposed to fluorescent light and direct sunlight for various intervals before testing.

By comparing the light-struck development under fluorescent light using flint export, green export, amber nonreturnable and amber export bottles, a definite pattern of light stability was found. The best stability occurred when the point of addition was after the kettle or after fermentation, with amber bottles affording the most protection (Table I). The conventionally hopped beer in flint and green export bottles became light-struck in 3 and 5 hours, respectively, while the amber nonreturnable bottles had a pronounced off-aroma in 4 days. The amber export bottles provided protection up to 10 days for the conventionally hopped beer. The tests showed that the type of bottle influenced light stability regardless of the method of hopping. The amber export bottles provided the best protection against a light-struck character while the flint export bottles exhibited less light stability.

TABLE I.—DEVELOPMENT OF PRONOUNCED LIGHT-STRUCK FLAVOR (Fluorescent light, 100 ft.-candle intensity)

| Type of bottle | Conventional hops to kettle, hours | Hop extract [1] to kettle, hours | Hop emulsion [2] to— | |
|---|---|---|---|---|
| | | | Cooled wort, hours | Ruh beer, hours |
| Flint export bottles | 3 | 7 | 72 | 72 |
| Green export bottles | 5 | 24 | | 192 |
| Amber nonreturnable bottles | 96 | | | 216 |
| Amber export bottles | 240 | 408 | | 480 |

[1] A pre-isomerized and reduced hop extract (ISOHOP®, Chas. Pfizer & Co., Inc.).
[2] A pre-isomerized and reduced hop extract emulsified according to the procedure of the present invention (REDI-HOP®, Chas. Pfizer & Co., Inc.).

However, it should be noted in table I that the manner of hopping was equally as important in providing light stability as the type of bottle. For example, the ruh addition of the hop extract emulsion to beer bottled in an amber export bottle showed twice the light stability as conventionally hopped beer bottled in the same type of container. Beer hopped by adding the hop extract emulsion to the cooled wort exhibited more than 24 times the stability of the conventionally hopped beer in flint export bottles. In green export bottles, the light stability was improved 38 times by adding the hop extract emulsion to ruh beer.

It should be kept in mind that the nonemulsified, preisomerized and reduced hop extract cannot be added to the cooled wort or Ruh beer because of its insolubility in these cold mixtures. It is the emulsification procedure of the present invention which permits this hop extract to be added at these postfermentation stages of beer making, i.e., postfermentation hopping.

The effect of different bottle types and point of addition of the hop extracts upon beer exposed to direct sunlight also was investigated (table II). The same light stability pattern was found with beers hopped conventionally, and hopped with either the preisomerized and reduced hop extract or the emulsion form, bottled in the four types of bottles and subjected to direct sunlight. Beer in flint export bottles, when hopped by adding the hop extract emulsion to cooled wort, showed an improvement of over 20 times in light stability. Table II shows that addition of the hop extract emulsion to ruh beer provided more than 37 times the light stability than beer hopped conventionally, when bottled in flint export bottles. The hop emulsion-treated beer had more than 6½ times the light stability as the conventionally hopped, when filled into nonreturnable bottles.

TABLE II.—DEVELOPMENT OF PRONOUNCED LIGHT-STRUCK FLAVOR (Direct sunlight, 5,000 ft.-candle intensity)

| Type of bottle | Conventional hops to kettle, min. | Hop extract [1] to kettle, min. | Hop emulsion [2] to— | |
|---|---|---|---|---|
| | | | Cooled wort, min. | Ruh beer, min. |
| Flint export bottles | 2 | 15 | 45 | 75 |
| Green export bottles | 6 | 20 | | [3] Normal |
| Amber nonreturnable bottles | 20 | | | 135 |
| Amber export bottles | 45 | [3] Normal | | [3] Normal |

[1] A pre-isomerized and reduced hop extract (ISOHOP®, Chas. Pfizer & Co., Inc.).
[2] A pre-isomerized and reduced hop extract emulsified according to the procedure of the present invention (REDI-HOP®, Chas. Pfizer & Co., Inc.).
[3] 360 minutes.

The above results clearly show that the greatest light stability is obtained with beer prepared from the preisomerized and reduced hop extract emulsion of the present invention.

As previously mentioned, the preisomerized and reduced hop extract compositions prepared by the process of this invention are readily dispersible in cold water, wort and beer. This property allows for a significant increase in isohumulone utilization. In the older methods of making beer, another 10 to 20 percent of the isohumulone content was lost after kettle boiling and during fermentation and storage because of isohumulone adsorption onto coagulated protein and yeast. When preisomerized and reduced hop extracts are prepared by the process of this invention, they may be added to the cold beer after fermentation and storage so that the isohumulone is not lost by adsorption on the coagulated protein and yeast.

We have also surprisingly found that our compositions are remarkably stable in regard to shelf life as compositions and in regard to the stability of the isohumulones concentration. The compositions of this invention form emulsions which are stable over a period of several months when stored at temperatures of 25° C., 32° C. and 37° C. and which are stable to repeated freeze-thaw cycling. The more concentrated compositions of this invention also form stable emulsions when diluted with cold water, cold beer or cold wort.

According to the present invention, the preisomerized and reduced hop extracts are solubilized and stabilized in the form of emulsions by intimately mixing therewith an emulsifying agent and gum arabic. The ingredients may be added in any order to a high-speed mixer such as a Waring blender or a laboratory homogenizer. Stable emulsions containing from about 12 to 42 percent by weight of hop extract have been prepared. Gum arabic has been shown to be essential in preparing a stable, liquid emulsion. The gum may be added either as a solid, ore more conveniently, as a liquid solution and preferably as an aqueous solution. We have found that from about 27 to about 36 percent by weight of gum arabic based on the weight of the total composition gives stable cold-water dispersible emulsions. Twenty-seven percent gum arabic is sufficient for obtaining 40 percent hop extract emulsions while 36 percent gum arabic is required to obtain 20 percent hop extract emulsions. While sorbitol is not essential in the process of this invention, we have found that the addition of sorbitol to the extract, gum arabic and emulsifying agent contributes to the stability of the emulsion and is to be preferred. The sorbitol may be added either in its crystalline form or as an aqueous solution. From about 7 to about 45 percent by weight of sorbitol stabilizes the emulsions and allows the use of less gum arabic. Any emulsifying agent which is known in the art and which is nontoxic, effective in cold water and does not adversely affect the taste of the beer is useful in the process of this invention. Those that have given stable, liquid, cold-water dispersible emulsions and which are preferred are dioctyl sulfosuccinate and sodium lauryl sulfate. Other agents which are effective are polyoxyethylene sorbitan monolaurate, polyoxyethylene sorbitan monopalmitate, polyoxyethylene sorbitan monostearate, polyoxyethylene sorbitan mono-oleate, polyoxyethylene sorbitan trioleate, sorbitan monolaurate, sorbitan monopalmitate, sorbitan mono-oleate, sorbitan trioleate, polyethylene glycol 200, polyethylene glycol 400, polyethylene glycol 600 and propylene glycol monolaurate and the like. Generally, from about 0.04 to 2.0 percent of emulsifying agent in the emulsion is sufficient. Of course, higher concentrations are also effective but tend to decrease the foaming characteristics and adversely effect the taste of the beer and ale.

We have found that stable, liquid cold-water dispersible emulsions are formed when part of the gum arabic is replaced with sorbitol. We have found that whereas the amount of gum arabic required runs from about 27 percent to about 36 percent, the addition of sorbitol lowers the required amount of gum arabic to about 7 percent based on the weight of the total composition and further stabilizes the emulsions so formed. Preferably, the amount of sorbitol is from about 7 percent to about 34 percent based on the total composition weight.

According to other aspects of this invention as it relates to an improvement in the process for making beer and ale, the stable, liquid hop extract emulsions may be used as a complete replacement for hops.

A specific embodiment of the process of this invention which yields a 42.5 wt. percent hop extract emulsion comprises mixing in a high speed blender, such as a Waring blender, about 25 parts of sorbitol, preferably in the form of a 70 percent aqueous solution, from about 35 to 60 parts of gum arabic and preferably about 35 parts as a 35 percent aqueous solution, and from about 0.04 to 2.0 parts of one of the emulsifying agents or a mixture of the emulsifying agents mentioned above. Water is added to give about 75 parts per 100 parts of hop extract and includes the water in the solutions of gum arabic and sorbitol if such solutions were used. To these ingredients is added 100 parts by weight of a hop extract from which the alcohols, ketones or hydrocarbons by which the product is extracted from the hops have been removed. While the order of addition of the ingredients is not critical, a preferred procedure is to blend the water, gum arabic, emulsifying agent and sorbitol first and then slowly add hop extract. Preferably, the hop extract is preheated to about 70° C. to insure complete and rapid emulsification. When crystalline sorbitol is used, a preferred method comprises preheating the sorbitol to about 110° C. to facilitate handling and mixing. The aforesaid ingredients are mixed at high speed for from 3 to 30 minutes depending on the size of the batch. The resulting emulsion may be diluted with cold water to yield emulsions of lower hop concentration.

The preisomerized and reduced hop extract emulsions are added to the beer any time after kettle boiling. The amount of hop extract emulsion added during the beer making process depends on the degree of bitterness the brewmaster desires and on the percent utilization of isohumulone in his product. Each brand of beer and ale has its own distinctive flavor which the brewmaster can control by using more or less of the hop extract emulsion. Generally, from about 3 to about 5 pounds of a 42.5 wt. percent preisomerized hop extract emulsion per 100 barrels of fermented beer gives a flavorful product.

The following examples further illustrate this invention and are not to be construed as limiting the scope thereof. On the contrary, resort may be had to various other embodiments, modifications and equivalents which readily suggest themselves to those skilled in the art without departing from the spirit of the present invention or the scope of the appended claims.

EXAMPLE I

A hop extract emulsion containing 42.5 weight percent preisomerized and reduced hop extract is prepared by adding slowly 42.5 pounds of hop extract heated to 70° C. to a rapidly stirred mixture of 15 pounds of a 70 percent aqueous solution of sorbitol, 42 pounds of a 60 percent aqueous solution of gum arabic and 1.5 pounds of polyoxyethylene sorbitan mono-oleate and adding the mixture to a Gaulin Laboratory Homogenizer at 1,700 pounds/sq. inch and maintaining the mixture at a temperature of about 70° C.

The hop extract emulsion is analyzed for isohumulones by the method of Alderton, et al. and published in Anal. Chem. 26, 983 (1954) and is found to contain about 17 percent isohumulones. Samples of the emulsion are stored at 25° C. and at 37° C. for 6 months. After storage, the samples are found to be stable emulsions analyzing about 17 percent isohumulones.

| Formulation | Parts by Weight | |
|---|---|---|
| Sorbitol (dry basis) | 10.5 | 25 |
| Gum arabic (dry basis) | 21.0 | 49 |
| Water | 24.5 | 58 |
| Emulsifying agent | 1.5 | 4 |
| Preisomerized and reduced hop extract | 42.5 | 100 |
| | 100.0 | 236 |

EXAMPLE II

A preisomerized and reduced hop extract emulsion containing 42 percent hop extract is prepared by adding slowly 84 grams of a preisomerized and reduced hop extract heated to 70° C. to a rapidly stirred mixture of 56.5 grams of a 70 percent aqueous sorbitol solution, 56.5 grams of a 35 percent aqueous gum arabic solution and 3.0 grams of polyoxyethylene sorbitan monolaurate in a Waring Blender for 6 minutes.

| Formulation | Parts by Weight | |
|---|---|---|
| Sorbitol (dry basis) | 19.8 | 47.1 |
| Gum arabic (dry basis) | 9.9 | 23.5 |
| Water | 26.8 | 63.8 |
| Emulsifying Agent | 1.5 | 3.6 |
| Isohop[1] | 42.0 | 100.0 |
| | 100.0 | 238.0 |

[1]Isohop, trademark of Chas. Pfizer & Co. for a reduced and preisomerized hop extract.

Similar emulsions are prepared by substituting for 84 grams of extract, 46, 25.6 and 12.9 grams of extract. The resulting emulsions contain 23 percent, 12.8 percent and 6.4 percent hop extract, respectively.

| Formulation percent extract | 6.4 | | Parts by weight 12.8 | | 23 | |
|---|---|---|---|---|---|---|
| Sorbitol (dry basis) | 32.2 | 502.3 | 30 | 23.4 | 26.4 | 115 |
| Gum arabic (dry basis) | 16.2 | 251.6 | 15.0 | 117.1 | 13.2 | 57.4 |
| Water | 43.7 | 683.0 | 40.7 | 318 | 35.9 | 156 |
| Emulsifying agent | 1.5 | 23.4 | 1.5 | 11.7 | 1.5 | 6.5 |
| Pre-isomerized and reduced hop extract | 6.4 | 100 | 12.8 | 100 | 23 | 100 |

EXAMPLE III

A preisomerized and reduced hop extract emulsion containing 40 weight percent preisomerized and reduced hop extract is prepared by adding slowly 4.0 pounds of a preisomerized and reduced hop extract, heated to 70° C., to a rapidly stirred mixture of 6.0 pounds of a 45 percent aqueous solution of gum arabic and 0.004 pounds of dioctyl sodium sulfosuccinate in a laboratory blender. The mixture is rapidly stirred for 3 minutes and yields a stable emulsion dispersible in cold water, cold beer and cold wort.

| Formulation | Parts by Weight | |
|---|---|---|
| Gum arabic (dry basis) | 27 | 67 |
| Water | 33 | 83 |
| Dioctyl sodium sulfosuccinate | 0.04 | 0.1 |
| Preisomerized and reduced hop extract | 40 | 100 |
| | 100 | 250 |

EXAMPLE IV

A preisomerized and reduced hop extract emulsion containing 28.5 percent hop extract is prepared by adding slowly 285 grams of a preisomerized and reduced hop extract heated to 70° C. to a rapidly stirred mixture of 364 grams crystalline sorbitol which has been melted and cooled to 90° C., 173 grams of gum arabic and 5 grams polyoxyethylene sorbitan monostearate to 173 grams of water in a Waring blender. The mixture is rapidly mixed for 6 minutes and yields a stable emulsion.

| Formulation | Parts by Weight | |
|---|---|---|
| Sorbitol | 36.40 | 128 |
| Gum arabic | 17.3 | 61 |
| Water | 17.3 | 61 |
| Emulsifying agent | 0.50 | 2 |
| Preisomerized and reduced hop extract | 28.50 | 100 |
| | 100.00 | 351 |

EXAMPLE V

A dewaxed preisomerized and reduced hop extract is prepared by dissolving one part by weight of preisomerized and reduced extract in two parts by weight of anhydrous methanol and cooling the solution to 10° C. The waxes which precipitate are filtered from the solution and washed with one part of methanol. The filtrate and washings are combined and the methanol is distilled from the extract at about 25° C.–65° C. and 50 mm. Hg. pressure.

A reduced and dewaxed preisomerized hop extract emulsion containing 28.2 percent of reduced, dewaxed and preisomerized hop extract is prepared by adding slowly 282 grams of the dewaxed hop extract, prepared according to the procedure above, and heated to 80° C. to a rapidly stirred mixture of 280 grams crystalline sorbitol, 150 grams gum arabic, 8 grams polyoxyethylene sorbitan monopalmitate to 280 grams water in a Waring blender. The mixture is rapidly stirred for 6 minutes and yields a stable emulsion which is dispersible in cold beer, cold water and cold wort.

| Formulation | Parts by Weight | |
|---|---|---|
| Sorbitol | 28.0 | 15.0 |
| Gum arabic | 15.0 | 53.2 |
| Water | 28.0 | 99.0 |
| Emulsifying agent | 0.8 | 2.8 |
| Hop extract | 28.2 | 100.0 |
| | 100.0 | 270.0 |

EXAMPLE VI

A reduced and dewaxed preisomerized hop extract emulsion containing 17.5 percent hop extract is prepared by adding slowly 175 grams of a reduced, dewaxed, and preisomerized hop extract, prepared according to Example V, and heated to 70° C. to a rapidly stirred mixture of 580 grams crystalline sorbitol, 240 grams of a 35 percent aqueous solution of gum arabic, 5 grams of polyoxyethylene sorbitan trioleate in a Waring blender. The mixture is rapidly stirred for 6 minutes and forms a stable emulsion.

| Formulation | Parts by Weight | |
|---|---|---|
| Sorbitol | 58.0 | 343 |
| Gum arabic (dry basis) | 8.4 | 48 |
| Water | 15.6 | 89 |
| Emulsifying agent | 0.5 | 3 |
| Hop Extract | 17.5 | 100 |
| | 100.0 | 283 |

EXAMPLE VII

An unfermented beer wort is prepared by mashing ground malt, saccharifying the mash to produce fermentable sugars, filtering and sparging the mash to obtain a fermentable wort and boiling said wort to precipitate undesirable nitrogenous and proteinaceous constituents. To 100 barrels of the wort, which has been cooled in a cooling coil, are added 4.6 pounds of the 42½ percent hop extract emulsion prepared according to example I. The hopped wort is allowed to ferment for about 2 weeks, is filtered, aged for about 6 weeks and refiltered to obtain a commercial beer product. The beer is analyzed by the Rigby Method I as described in the Amer. Soc. Brewing Chemists, Proc. 46, 1961 and is shown to contain 18 Isohumulone Bitterness Units and possess a rich, flavorful taste that is comparable to standard commercial beers.

EXAMPLE VIII

An unfermented beer wort is prepared according to example VII. To 100 barrels of the wort is added 1 pound of the 42 percent preisomerized and reduced hop extract emulsion prepared according to example II. The partially hopped wort is fermented for 2 weeks. To the fermented wort is added 3 pounds of the emulsion. The beer is aged for 2 weeks and filtered. The product is shown to contain 18 Isohumulone Bitterness Units when analyzed by the Rapid Method for Isohumulone Analysis as described in Methods of Analysis, Amer. Soc. Brewing Chemists, 6th Revised Edition, 66K, 1958. The finished beer has good taste and aroma.

EXAMPLE IX

One hundred barrels of an unfermented wort prepared according to example VII is partially hopped by the addition of 10 pounds of hops. The hops are boiled in the kettle and allowed to ferment for 2 weeks. Analysis of the beer by the Rapid Method as described in example VIII shows about 6 Isohumulone Bitterness Units (I.B.U.). To the fermented beer are added 6 pounds of the 17.5 percent reduced, dewaxed and preisomerized emulsion of example V. After aging for 2 weeks, the product is found to contain 18 I.B.U. and is comparable in taste and aroma to commercial beers of equivalent isohumulone content.

What is claimed is:

1. A process for rendering a preisomerized and reduced hop extract dispersible in aqueous media, which comprises intimately mixing with said extract a nontoxic emulsifying agent and gum arabic.

2. A process for rendering a preisomerized and reduced hop extract dispersible in aqueous media, which comprises intimately mixing therewith in an aqueous medium a nontoxic emulsifying agent and between about 36 percent and 7 percent by weight of gum arabic and 0 percent and 45 percent by weight of sorbitol.

3. The process of claim 2 wherein said nontoxic emulsifying agent is selected from the group consisting of dioctyl sodium sulfosuccinate and sodium lauryl sulfate.

4. In the process of making beer and ale by the steps of mashing the ground malt with or without an unmalted cereal adjunct, saccharifying the mash to produce fermentable sugars, filtering and sparging the mash to obtain a fermentable wort, kettle-boiling the wort to precipitate undesirable wort constituents and to destroy undesirable microflora, and fermenting the wort to beer; the improvement which comprises hopping the wort after kettle-boiling by the addition of the product of the process of claim 1 and then fermenting the hopped wort.

5. In the process of making beer and ale by the steps of mashing the ground malt with or without an unmalted cereal adjunct, saccharifying the mash to produce fermentable sugars, filtering and sparging the mash to obtain a fermentable wort, boiling the wort to precipitate the undesirable wort constituents and to destroy undesirable microflora, and fermenting the wort to beer; the improvement which comprises hopping the fermented beer by the addition of the product of the process of claim 2.

6. A hop extract composition comprising by weight from about 18 to about 180 parts of gum arabic, from about 18 to about 225 parts of sorbitol, from about 55 to about 220 parts of water and from about 0.1 to about 5 parts of emulsifying agent for each 100 parts of preisomerized and reduced hop extract.

7. A hop extract composition comprising by weight about 25 parts of sorbitol, about 49 parts of gum arabic, about 58 parts of water and about 5 parts of dioctyl sodium sulfoccinate for each 100 parts of sulfosuccinate and reduced hop extract.

* * * * *